INVENTORS:
N. D. SMITH
C. B. VOGEL

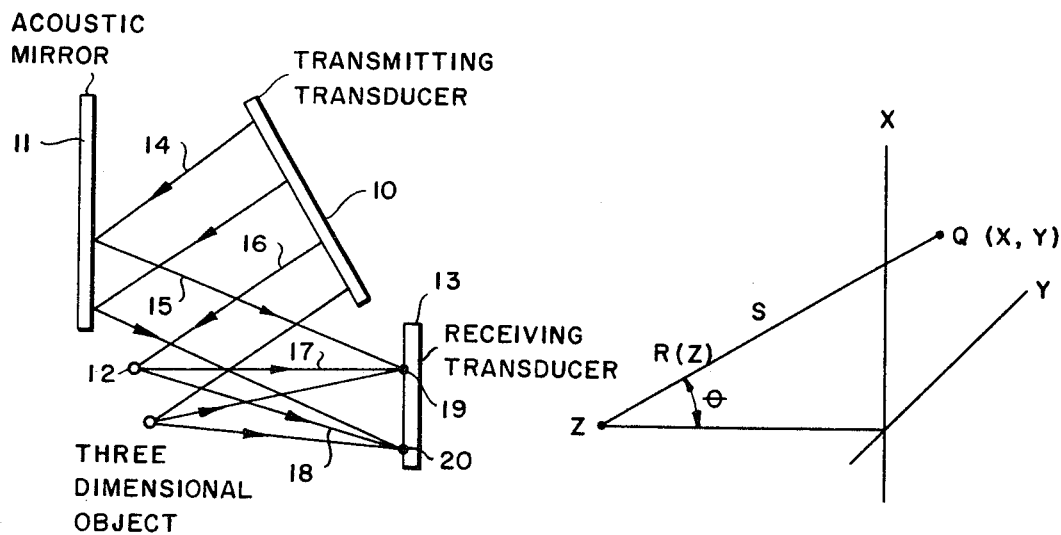
FIG. 1
FIG. 2
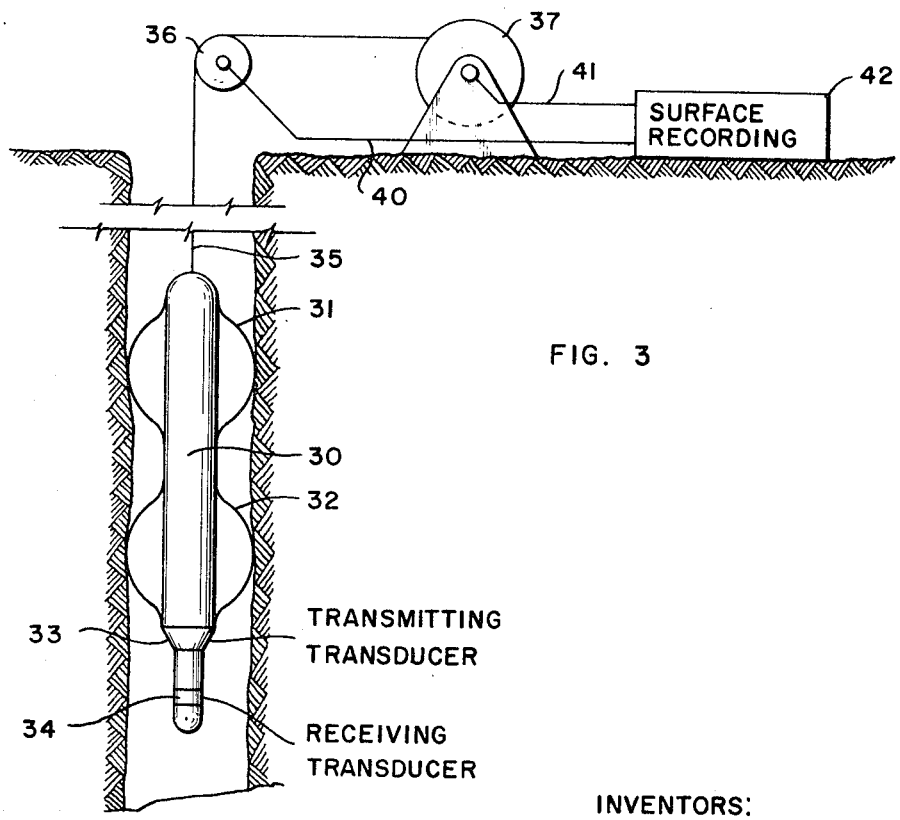
FIG. 3

BY: *Theodore E. Bisley*
THEIR ATTORNEY

United States Patent Office 3,515,237
Patented June 2, 1970

3,515,237
METHOD FOR OBTAINING ACOUSTICAL HOLO-
GRAM OF THE INTERIOR WALL OF A TUBU-
LAR MEMBER
Noyes D. Smith, Jr., Bellaire, and Charles B. Vogel, Houston, Tex., assignors to Shell Oil Company, New York, N.Y., a corporation of Delaware
Filed Aug. 28, 1967, Ser. No. 663,790
Int. Cl. G01v 1/00
U.S. Cl. 181—.5                5 Claims

ABSTRACT OF THE DISCLOSURE

A method for forming an acoustic hologram of the wall of a tubular member wherein the wall is irradiated with coherent acoustic waves, and waves that are scattered from the wall are converted to electrical waves and mixed with electrical waves corresponding to the coherent acoustic waves. A visible pattern that is related to the mixed waves and the locations from which acoustic waves are scattered is displayed on an oscilloscope. The face of the oscilloscope is photographed to provide a film transparency that can be illuminated with coherent light to provide a real image of the wall of the borehole.

BACKGROUND OF THE INVENTION

In a copending application of the same inventor entitled "Apparatus for Mapping a Wall of a Borehole," Ser. No. 648,700, filed June 26, 1967, there is described a method for acoustically mapping the wall of a tubular member, as for example the wall of a borehole. The method used consists of irradiating the wall of the borehole with ultrasonic acoustical energy and detecting the acoustical waves that are scattered from the borehole wall. The method is specifically designed to discriminate against acoustical waves that are reflected or refracted from the borehole wall. The received scattered radiation is then displayed as an optical two-dimensional image in the form of a continuous film record. This provides a continuous two-dimensional photograph of the wall of the borehole that can be used to detect the locations of fractures and other anomalies along the borehole wall. While the method of the copending application provides a two-dimensional picture of the wall of the borehole, it provides no indication of the depth or extent of various anomalies and fractures.

The copending application also illustrates and describes a logging tool in which the scattered radiation from the borehole wall is focused by an acoustic lens onto a material such as barium titanate that transforms the received acoustic waves at each point to a corresponding electrical potential difference. The invention describes a means for scanning the areal distribution of the potential difference of the transducer and reproducing this distribution as an optical image on the face of the cathode ray oscilloscope. The face of the cathode ray oscilloscope is then photographed to provide a continuous photograph of the wall of the borehole.

BRIEF DESCRIPTION OF THE INVENTION

The present invention solves the above problem by recording an acoustic holographic image of the wall of a tubular opening and converting the acoustic hologram to an analogous optical hologram that can be illuminated by coherent light to produce an optical three-dimensional image corresponding to the wall of the opening. The optical three-dimensional image may then be studied to detect the location of fractures and other anomalies in the wall of the opening as well as to determine the size of the fractures and anomalies. More particularly, the present invention irradiates the wall of a tubular opening with coherent ultrasonic acoustic energy and then detects the scattered radiation. The received scattered radiation is transduced to related electrical energy and mixed with electrical energy related to the coherent ultrasonic acoustic energy. A visible pattern that has an intensity related to the intensity of the mixed electrical energies and a distribution related to the areal distribution of the received scattered radiation is displayed. Coherent light is diffracted from the display to form three-dimensional optical images of the portion of the wall of a tubular opening that is irradiated with the coherent ultrasonic energy.

BRIEF DESCRIPTION OF THE DRAWINGS

The above invention will be more easily understood from the following detailed description of a preferred embodiment taken in conjunction with the attached drawings in which:

FIG. 1 is a schematic display of the transmitting and receiving transducers illustrating the theory of this invention;

FIG. 2 is a line drawing used in illustrating the use of an electrical signal to provide the equivalence of an acoustic reference wave to provide a true acoustic holographic signal;

FIG. 3 is an elevation view of a logging instrument constructed according to this invention disposed in a borehole;

Figure 4:
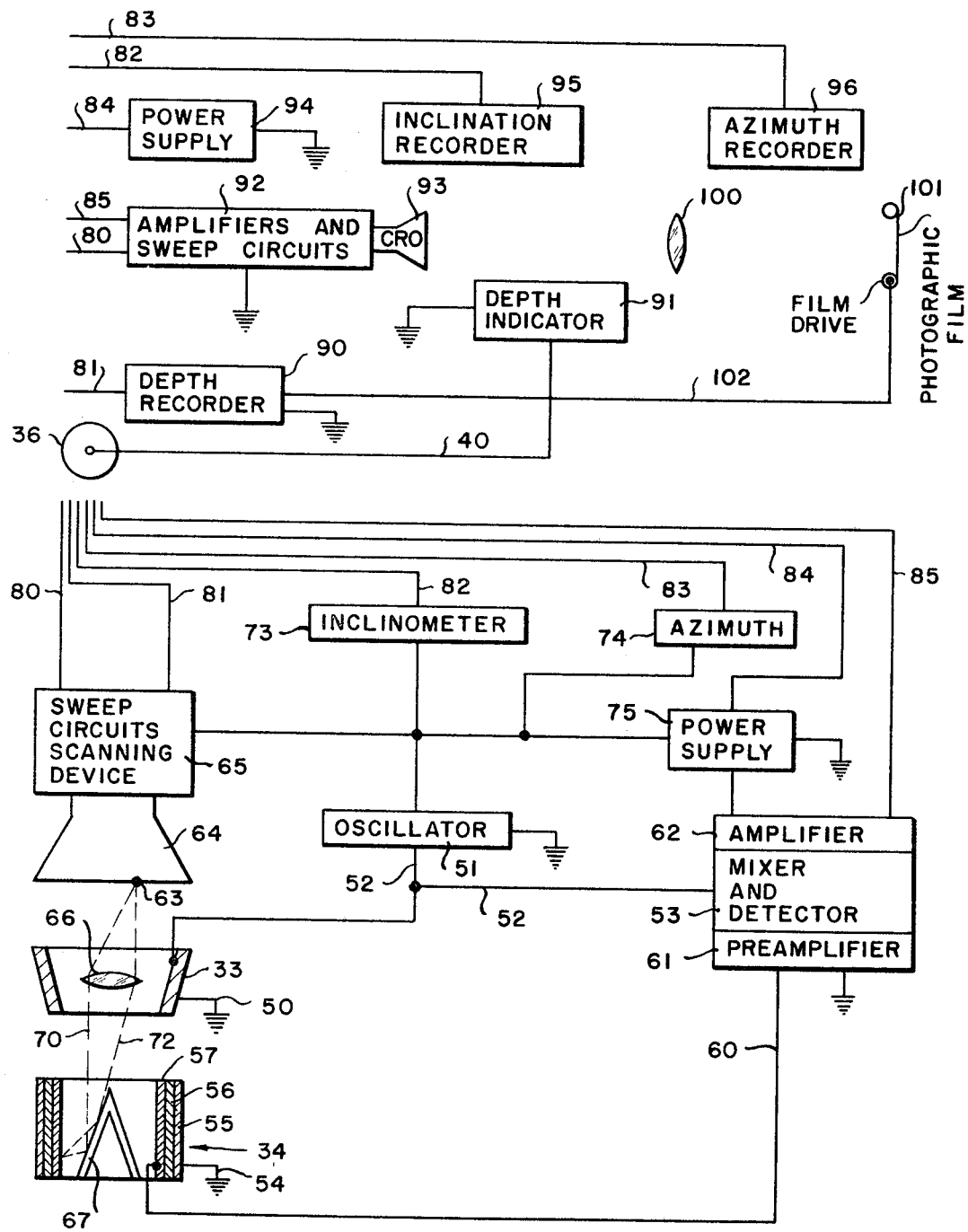
FIG. 4 is a block diagram of the recording system of the invention.

Reference is made to FIGS. 1 and 2 that illustrate the theory of the present invention. As is well known an optical hologram is formed by illuminating an object with monochromatic coherent light and then mixing the reflected light with a reference beam from the coherent light source and recording the resulting light mixture on film. By mixing the reference beam with the reflected light one not only obtains a signal which is related to the amplitude of the reflected light, but which also contains information relating to phase of the reflected light. When the resulting film record is illuminated with coherent light, one may view both the real three-dimensional image and the reflected or virtual image of the original object.

The present invention utilizes the same phenomena to obtain a signal which not only reflects the amplitude of the scattered acoustic radiation, but also the phase of the scattered radiation. The resultant radiation (scattered wave from the object and a reference wave) impinges on a transducer which produces an electrical potential at each point proportional to the resultant acoustic wave at each point. The transducer is then scanned by a means which preserves the amplitude and phase relationship of the original signal and converts the received signals to analog electrical signals. As shown in FIG. 1 a transmitting transducer 10 illuminates a three-dimensional object 12 with a beam of coherent acoustical waves. The acoustic waves scattered by the three-dimensional object are received by and impinge on the surface of the receiving transducer 13 resulting in a pattern of potential charges. The potential charge at each point on the surface of the receiving transducer 13 is the resultant of all the scattered waves impinging at that point. The resulting signal will have an amplitude which varies in time with the frequency of the radiated waves but with a constant phase. To preserve the phase of the signal an acoustic mirror 11 is positioned so as to reflect a portion of the radiation of the transmitting transducer 10 to provide a reference beam 15 that impinges upon the receiving transducer 13. The reference beam 15 will interfere with the scattered waves and will produce an interference pattern on the face of the receiving transducer 13. The time-averaged pattern of intensities as a function of position is an acoustic hologram.

FIG. 2 illustrates a simple example in which the $x$, $y$ plane is considered to lie upon the surface of the receiving transducer 13 of FIG. 1. If one considers a single point and assumes that the reference beam falls normally on the transducer face, for example at point $Q(x,y)$, then the resulting pressure at the point Q will be $Q(x,y,t)$ as a function of time due to the scattered waves from the point object at the point $R(z)$. If one assumes that the amplitude of the scattered waves varies with the cosine of the angle between the $z$ axis and the line S, then the pressure at the point Q would be the sum of the pressures due to the reference wave $P_r \sin(\omega t + \phi_r)$ where $\phi_r$ is the phase angle depending upon the location of the acoustic mirror. The pressure of the scattered wave can be expressed as $$P_R \cos \theta / S \sin \left( \omega t + \frac{2\pi S}{\lambda} + \phi_r \right)$$

where $\phi_r$ is the phase of the wave being scattered at the point R.

The pressure at point Q as a function of time is $$P(x,y,t)$$

and is given by $$P(x, y, t) = P_r \sin(\omega t + \phi_r) + \frac{P_R z}{S^2} \sin \left( \omega t + \frac{2\pi S}{\lambda} + \phi_R \right)$$

This can be reduced to the following form:

$$P(x, y, t) = \left[ P_r^2 + \frac{P_R^2 z^2}{S^4} + \frac{2P_r P_R z}{S^2} \cos \left( \frac{2\pi S}{\lambda} + \phi_R - \phi_r \right) \right]^{1/2} \sin(\omega t + \Psi)$$

The pressure $P(x,y,t)$ at Q produces a potential difference across the element of the piezoelectric transducer. This potential difference $e(x,y,t)$ can be expressed by $$e(x, y, t) = k \left[ P_r^2 + \frac{P_R^2 z^2}{S^4} + \frac{2P_r P_R z}{S^2} \cos \left( \frac{2\pi S}{\lambda} + \phi_R - \phi_r \right) \right]^{1/2} \sin(\omega t + \Psi)$$

where $k$ is the constant of proportionality.

If the potential difference at point Q on the transducer is connected to a square law rectifier and integrator circuit with a time constant long compared to a period of the acoustic wave, then the response will be proportional to the time average of $e^2$ which can be expressed as $$\left[ \overline{e(x, y, t)} \right]^2 = K \left[ P_r^2 + \frac{P_R^2 z^2}{S^4} + \frac{2P_r P_R z}{S^2} \cos \left( \frac{2\pi S}{\lambda} + \phi_R - \phi_r \right) \right]$$

where K is a constant of proportionality.

When the above equation is inspected, it is seen that it is a function of $x$ and $y$ and independent of time. Further, the function is an acoustic hologram which can be developed by scanning the surface of the transducer and presenting $e^2$ on an oscilloscope and then photographing the oscilloscope to provide a permanently recorded hologram.

Since in practice it is not convenient to supply an acoustic reference beam, an electrical signal related to the reference beam can be substituted. From the proceeding discussion it is seen that the voltage $e$ is equal to $$KP_r \sin(\omega t + \phi r) + \frac{KP_{Rz}}{S^2} \sin \left( \omega t + \frac{2\pi S}{\lambda} + \phi_R \right) = e_r(x, y, t) + e_R(x, y, t)$$

If the voltage $e_R$ is sampled, and a voltage $e_r$ supplied from the oscillator driving the source of acoustic waves added to $e_R$, then the result is the same as supplying an acoustical reference wave. Thus, in a system for use in a borehole the receiving transducer could be a cylinder, and the reference voltage is equivalent to a cylindrical reference wave generated on the axis of the cylindrical transducer. The presentation of the resulting hologram on the plane face of an oscilloscope is equivalent to developing the cylindrical hologram into a plain rectangle. The photographic recording of the acoustic hologram, when reduced in size and illuminated with a beam of coherent light, will provide an optical reconstruction of the acoustic image of the borehole wall.

Referring now to FIG. 3 there is shown a simplified drawing of an instrument suitable for carrying out this invention in a borehole. The instrument utilizes an instrument case 30 in which the various electronic circuits are mounted, with the instrument case being lowered and raised in the borehole by means of a cable 35. The cable 35, of course, contains the necessary conductors for transmitting power to the downhole tool as well as transmitting signals from the downhole tool to the surface recording instrument. The instrument case 30 is provided with centralizing springs 31 and 32 at opposite ends to maintain the instrument case at the center of the borehole. The transmitting transducer 33 and receiving transducer 34 are mounted adjacent the lower end of the instrument case 30. The transmitting transducer 33 is preferably a piezoelectric transducer, for example barium titanate may be used. In addition, the transducer should have a ring shape with an inclined outer surface. The receiving transducer 34 is a generally cylindrical-shaped element of composite construction that is more fully described below.

Signals from the downhole tool are transmitted to the surface over the cable 35 that is stored on a powered reel 37. The reel 37 is provided with a conventional slip ring arrangement in order that the signals may be removed from the cable 35 and transmitted over a conductor 41 to the surface recording instrument 42. The cable 35 passes over a measuring sheave 36 at the surface in order that the depth of the tool 34 may be accurately determined. The measuring sheave 36 powers a synchro-motor or Selsyn unit in the surface recording instruments by means of a cable 40. Thus, the position of the tool in the borehole may be accurately measured and recorded.

Referring now to FIG. 4 there is shown a block diagram of the downhole electronic circuits and the surface recording circuits. More particularly, the transmitting transducer 33 is shown in cross-sectional form. The outer surface of the transmitting transducer is inclined so that the plane waves generated will strike the borehole wall at an angle and be scattered by the fractures and other anomalies. The transmitting transducer is grounded at 50 and coupled to an oscillator 51 by means of a lead 52. The signal from the oscillator 51 is also supplied by the lead 52 to a mixer detector circuit 53 described more fully below.

The oscillator 51 can be a conventional crystal-controlled oscillator having a frequency in the range of 100 kc. to 4 megacycles per second. The oscillator frequency should be closely controlled to provide a substantially constant frequency source of acoustical waves. The receiving transducer 34 is a composite structure having an outer ring or cylinder 55 formed of a piezoelectric material, for example, barium titanate. Deposited on the inner surface of the barium titanate ring 55 is a photoconductive layer 56 which may, for example, be cadmium sulfide, zinc oxide or selenium. Deposited on the inner surface of the photoconducting layer 56 is a transparent conducting layer 57. The conducting layer 57 may be formed by depositing a very thin film of gold on the inner surface of the photoconducting layer 56. This type of receiver construction is more particularly described in the above-referenced copending application.

The outer cylinder 55 of the receiver 34 is grounded at 54, while the inner conducting layer 57 is coupled by means of a lead 60 to a preamplifier 61. The preamplifier 61, as explained above merely amplifies the signal and supplies it to the mixer detector circuit 53. The detector portion of the circuit 53 is preferably a square-law rectifier and integrating circuit with a time constant long compared to the period of the acoustic wave. With this type of circuit the detected electrical signal will be directly proportional to the pressure of the scattered waves impinging upon the detector portion 55 of the receiver 34. The mixer portion of the circuit 53 mixes the detected signal with the reference signal supplied from the oscillator 51 and rectifies the mixed signal. The rectified mixed signal is then amplified by the amplifier 62 and transmitted to the surface over the lead 85.

The radiation scattered from the wall of the borehole will impinge upon the receiver and form on the pressure-sensitive element 55 of the receiving transducer 34 an areal pattern of electrical charges or potentials. This pattern can be sampled and the potential converted to related electrical signals by various scanning means, for example, a flying spot scanner as shown in FIG. 4. Flying spot 63 is formed on the face of the cathode ray tube 64 by means of sweep circuits 65. Sweep circuits 65 should deflect the electron beam of the cathode ray tube to provide a spot of light on the interior of the receiving transducer which scans its cylindrical surface. The sweep circuits in addition to generating the circular sweep, should also generate a synchronizing pulse at the start of each scan of the flying spot scanner. The flying spot is focused by means of a mirror 66 on a conical reflector 67. The conical reflector reflects the rays of the flying spot onto the surface of the transparent conducting layer 57. Two rays 70 and 72 of the flying spot 63 are shown in FIG. 4. As the flying spot scans around the inner surface of the receiver 34, it will convert the pattern of potential charges on the receiver to related electrical signals. These electrical signals will be supplied to the mixer detector circuit 53 as explained above.

The downhole instrumentation is powered from a common power supply 75 that receives power over a lead 84 of the cable. Similarly, the inclination of the tool in the borehole is measured by an inclinometer 73 while the azimuth or orientation of the tool is measured by an azimuth-measuring means 74. The signals from the inclinometer and the azimuth-measuring means are supplied to the surface over the leads 82 and 83, respectively. Similarly, the synchronizing signal produced by the sweep circuit 65 is transmitted to the surface over the lead 80, while the lead 81 supplies a sweep signal to initiate a sweep cycle. More particularly, the lead 81 supplies a pulse at fixed depth intervals as explained below with the pulse in turn causing initiation of a sweep cycle.

The receiver signals along with the signals from the inclinometer, the azimuth-detecting means and the synchronizing signal from the sweep circuit are all transmitted to the surface where they are used to operate the various recording circuits. More particularly, the receiver signal is supplied to the amplifier sweep circuits 92 of the cathode ray oscilloscope 93. Similarly, the synchronizing signal is supplied to the amplifier and sweep circuits to initiate a sweep cycle of the cathode ray tube once for each scan of the receiver by the downhole equipment. The scanning of the downhole receiver is initiated by a signal from the depth recorder 90 that is coupled to the measuring sheave 36. At fixed depth intervals the depth recorder 90 supplies a signal over the lead 81 that initiates a scanning cycle of the downhole tool. The measuring sheave 36 is also coupled to a depth indicator 91 that displays the actual depth of the logging tool in the borehole in order that it may be recorded along with the signal as explained below. The signal from the inclinometer is recorded on the recorder 95 while the azimuth is recorded on the recorder 96. Both inclination and azimuth recorders record in relation to depth in order that the signal records may be correlated with the inclination and azimuth of the tool in the borehole. The downhole instrument is powered from a power supply 94 located at the surface which is coupled to the downhole instrument by means of a lead 84.

When the above system is operated, the downhole signals are supplied to the cathode ray oscilloscope 93 in synchronism with the scanning of the downhole receiver 34. The electrical signals form a pattern or image on the face of the cathode ray tube 93 that is focused by means of a lens 100 onto a photographic film 101. The image or pattern on the face of the cathode ray oscilloscope will correspond substantially to the normal holographic images that are recorded in optical holograms. Thus, the film record 101 will correspond substantially to the transparencies used in ordinary optical holograms. The film 101 should be advanced or film drive driven in synchronism with the depth of the tool in the borehole. This can be accomplished by coupling the film drive to the depth recorder 90 by means of leads 102. Thus, the film record will correspond to the acoustic hologram of the wall of the borehole and will be related to the depth of the tool in the borehole.

Figure 5:
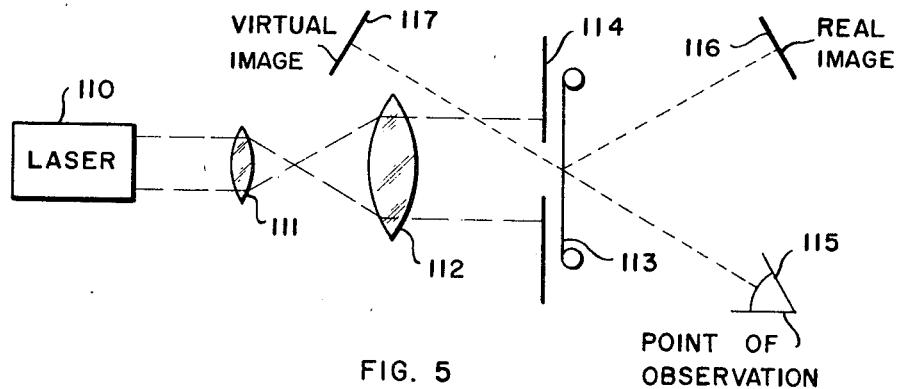
FIG. 5 illustrates one means for viewing the record to obtain an optical three-dimensional view.

Referring now to FIG. 5 there is shown a means for reconstructing the image of the borehole wall by using the film record obtained with the apparatus shown in FIG. 4. More particularly, the film record 113 is illuminated with monochromatic coherent light, for example, the light obtained from a laser light source 110. The beam from the laser 110 is focused by means of a lens 111 and then collimated by means of a lens 112 so that it falls on the film record 113. A mask 114 is placed in front of the film record to limit the illuminated record to the record that was obtained during a single scanning cycle of the downhole tool. When the above system is used and an observer views from the point 115, he will observe the virtual three-dimensional image at a point in space 117, while the real image will exist at a point 116 in space. The virtual image will be in a three-dimensional display of the wall of the borehole and will appear as though the map of the borehole wall was unwound and placed on a flat surface.

Figure 6:
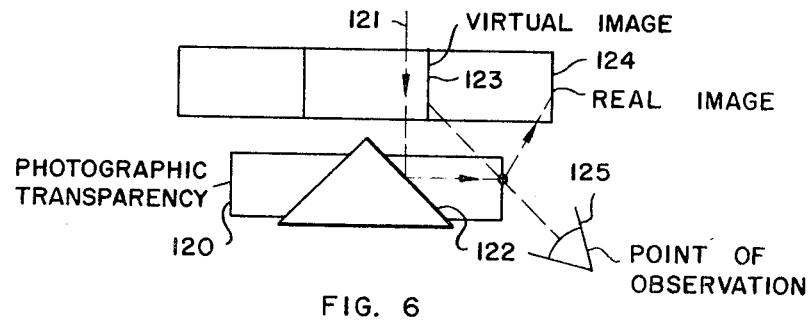
FIG. 6 illustrates a second means for viewing the record of this invention.

A second means for reconstructing the image of the borehole wall is shown in FIG. 6. In FIG. 6 the photographic transparency for a single scanning cycle of the borehole tool is formed into a cylindrical transparency 120. The cylindrical transparency is placed about a conical miror 122 that receives light rays 121 from a monochromatic coherent source as for example the laser source shown in FIG. 5. The monochromatic light will illuminate the photographic transparency and form a virtual image at a position 123 of reduced diameter and a real image at a position 124. Thus, an observer at the point 125 can observe the virtual image 123 which will correspond exactly to the surface of the borehole wall, except it will have a reduced diameter.

Figure 7:
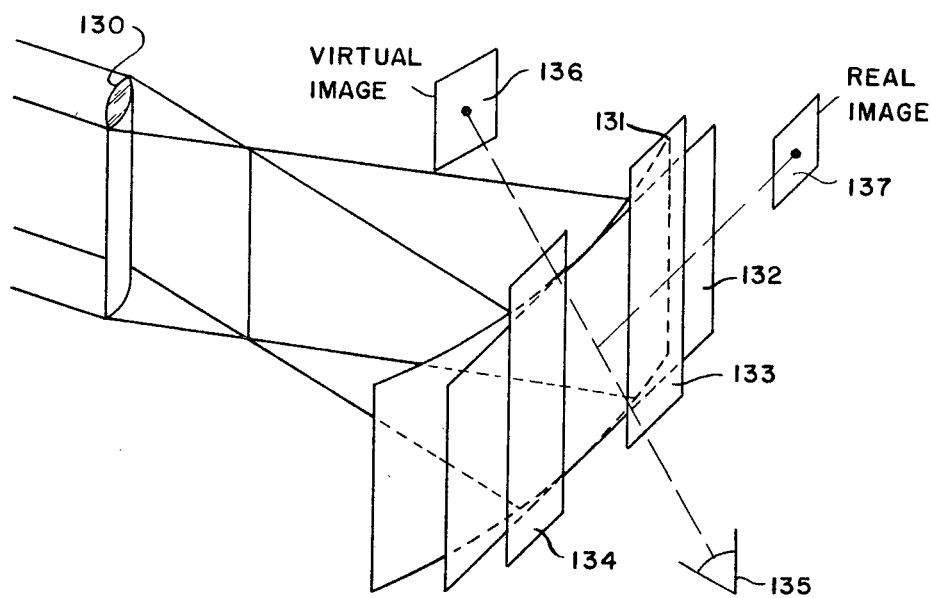
FIG. 7 illustrates a third means for viewing the record of this invention.

A third means for reconstructing the virtual image of the borehole wall is shown in FIG. 7. The monochromatic light is focused to a line image through an elongated double convex lens 130 to provide a cylindrical wavefront illumination across the face of the film record 132. In addition, suitable masks 133 and 134 should be positioned so that only a portion of the film record corresponding to a single scanning cycle of the downhole tool is displayed at any one time. In the system of FIG. 7 an observer positioned at 135 will observe the virtual image of a portion of the borehole wall at a position in space 136 and the real image at a position 137. The system can be made continuous by continuously advancing the film record 132 while the observer observes the virtual image. Of course, means may be provided for stopping the record in order that the observer may inspect in detail particular portions of the borehole wall. By photographing the image with a slit camera, a permanent two-dimensional picture of the circumference of the borehole can be made for measurement purposes.

While the invention has been described with reference to a particular transducer-receiver arrangement, other receiver-transducer arrangements may be utilized. For example, a transmitting transducer may radiate a beam of acoustic waves to the borehole fluid which strike the wall of the borehole at an angle. The acoustic waves striking the wall will then generate reflected waves in the fluid and surface waves in the solid. These waves in turn will generate compressional waves in the fluid which may be received at the receiving transducer. For example, by properly locating a receiver, one can discriminate against the reflected waves and receive substantially only the scattered radiation. Also, receiving transducers of various shapes may be used, such as a plane or polygon, instead of the cylinder described above.

While a single method of transforming the acoustic hologram into electrical signals has been described, other types of acoustic image transducers could be used.

While the invention has been described using a continuous acoustic source, a pulse source consisting of more than 20 cycles with the scanning of the receiving transducer suitably gated may be used to reduce unwanted acoustic waves from being recorded. The length of the pulse must be long enough to cause a signal over the entire face of the transducer while it is being scanned or alternatively the complete scan can be accomplished by partial scans for a series of pulses.

We claim as our invention:
1. A method for forming a three-dimensional display of the wall of a tubular opening comprising:
   illuminating the interior of the tubular opening with a radially expanding circular beam of coherent acoustic waves directed for glancing contact with a portion of the tubular wall;
   receiving at a tubular transducer the acoustic waves that are scattered from the illuminated portion of the wall, said transducer being axially spaced from the portion of the tubular wall contacted by said acoustic waves;
   producing an electrical indication of the received scattered acoustic waves, said electrical indication preserving both the circumferential areal location and amplitude of the received scattered acoustic waves;
   mixing the electrical indications of the received scattered acoustic waves with electrical energy having a frequency equaling the frequency of the coherent acoustic waves;
   displaying a visible pattern having an intensity related to the intensity of the resultant mixture of electrical energies and a distribution related to the circumferential areal distribution of the received scattered acoustic waves; and
   diffracting coherent light from the visible display to produce a visible three-dimensional image that is related to the nature and distribution of acoustic properties of the tubular wall.

2. The method of claim 1 wherein the visible display of the resultant mixtures is formed in a tubular element and coherent light is diffracted from the tubular element to produce a tubular three-dimensional image.

3. The method of claim 1 wherein the visible display of the resultant mixtures is formed in a continuous film and the coherent light is passed through an elongated double convex lens to illuminate a width of the film as the film is moved across the beam of coherent light.

4. The method of claim 1 wherein said beam of coherent acoustic waves is a continuous beam.

5. The method of claim 1 wherein said beam of coherent acoustic waves is a pulsed beam having at least 20 cycles.

References Cited
UNITED STATES PATENTS 3,400,363  9/1968  Silverman _____ 340—5

OTHER REFERENCES

Cutrona: IEEE Spectrum, October 1964, pp. 101–108.
Denisyuk: Optics & Spectroscopy, February 1965, pp. 152–156.
Ross: IBM Technical Disclosure Bulletin, September 1966, p. 390.

BENJAMIN A. BORCHELT, Primary Examiner
J. FOX, Assistant Examiner

U.S. Cl. X.R.
350—3.5